United States Patent Office 3,246,039
Patented Apr. 12, 1966

3,246,039
ALKENYL PHENOL THIOETHERS
Walter Reifschneider, Midland, Mich., assignor to The Dow Chemical Company, Midland, Mich., a corporation of Delaware
No Drawing. Filed June 17, 1963, Ser. No. 288,507
6 Claims. (Cl. 260—609)

This application is a continuation-in-part of copending prior application Serial No. 205,523, filed June 27, 1962.

The present invention is directed to thioethers and in particular is directed to novel thioethers corresponding to the formula

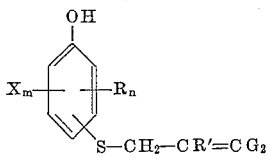

In the present specification and claims, R represents a lower alkyl group, R′ represents hydrogen or a lower alkyl group, $n$ is an integer from 0 to 4 inclusive; each G is independently selected from hydrogen, halogen of atomic weight of 10 to 100, as fluorine, chlorine and bromine and R; X represents lower alkyloxy, halo or nitro, $m$ is an integer from 0 to 4, both inclusive, and the sum of $m$ and $n$ is an integer from 0 to 4. In the present specification and claims, the expression "lower alkyl" is used to designate an alkyl group being of from 1 to 6, both inclusive, carbon atoms, and "lower alkylene" is used to designate a bivalent saturated aliphatic hydrocarbon radical being of from 1 to 6, both inclusive, carbon atoms.

The novel compounds are oils or crystalline solids appearing white or light yellow in mass, of low solubility in water but readily soluble in various common organic solvents such as lower alkanols, benzene and the like. The compounds are useful as insecticides and herbicides, various of them are distinctly valuable as anthelmintics. They are useful as toxicants with quite specific action against invertebrate animals including various vectors of disease such as snails, and against parasites of warm-blooded animals. They are useful as intermediates in the preparation of dyestuffs and biologically active materials; they are also of value as solvent additives in the modification of behavior of mixed solvent systems. Under free radical catalysts they can be made to polymerize to obtain materials of resinous or viscous nature, that are useful as plastics, plastics additives, and by addition thereto, as viscosity builders in petroleum hydrocarbon oils.

The compounds are prepared in any of three processes.

Most of the compounds are prepared by a first process which comprises the step of causing a reaction between a mercaptophenol compound corresponding to the formula

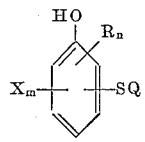

and an unsaturated halide corresponding to the formula

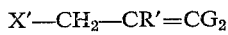

$$X'-CH_2-CR'=CG_2$$

wherein X, R, $m$, $n$, and R′ and G have the values previously indicated, Q represents hydrogen, alkali metal, or cuprous copper, and X′ is a halogen. During the reaction to prepare the present compounds, one molecule of mercaptophenol compound reacts with each molecule of unsaturated halide. Small amounts of either compound may be lost in side reactions. Good results are obtained when employing the reactants in equimolecular amounts. However, other proportions may be employed if desired, and unconsumed starting material of whatever indentity may, if desired, be recycled into further synthesis process. When mercaptan is employed, a hydrogen halide acceptor should also be employed. It can be sodium hydroxide or a tertiary amine.

The reaction goes forward at temperatures over a wide range such as from 0° to 300° C., but initiates most readily when heated to a temperature somewhat higher than room temperature. A preferred temperature is from 0° to 80° C. Under these conditions, the reaction goes forward to completion with good yield calculated upon the basis of consumed starting material. Although such contamination is unlikely, the reaction mixture should not be contaminated with such substances as induce or favor polymerization of unsaturated substances, if undesired side effects are to be avoided.

In carrying out the reaction to prepare the compounds of the present invention, the unsaturated compound and the phenolic compound are intimately mixed and blended, in any order and in desired amounts, preferably in liquid reaction medium such as a lower alkanol, and thereafter heated to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is filtered, heated to vaporize and remove reaction medium, taken up in excess 10 percent aqueous sodium hydroxide; the resulting solution washed with diethyl ether and poured into a mixture of ice and concentrated hydrochloric acid whereupon a precipitate forms from which the desired product can be extracted as a solvent-soluble fraction. Representative extraction solvents include methylcyclohexane, chlorinated hydrocarbons, carbon disulfide, and benzene. In any event, the reaction product can be extracted with solvent, the solvent extract dried over an inert drying agent such as, for example, anhydrous sodium sulfate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The cuprous or alkali metal mercaptide can be prepared in situ in the reaction as employed by combining therein the mercaptophenol compound and a stoichiometric amount of alkali metal or alkali metal hydroxide or the like.

Not all the compounds of the present invention can be prepared in the foregoing method, although many of them can, and the method is often preferred for convenience. The compounds of the present invention, including those which cannot be prepared in the foregoing method can all be prepared, conveniently and in good yield, by either of the two following second and third methods, which are preferred for their versatility.

In the second method or preparation of compounds of the present invention, a hydroxy alkylthiophenyl thiocyanate of the formula

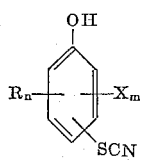
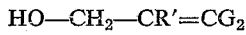

is caused to react with an alcohol of the formula $$HO-CH_2-CR'=CG_2$$

in the presence of a base. In the general formulae of the present method, the symbols X, m, n, G, R' and R have the values hereinbefore defined. In the present process, the alcohol and (thiocyanato) phenol compound react together in equimolecular amounts, but the reaction is favored by the employment of excess alcohol. Moreover, when such alcohol is of appropriate identity, it may be employed in excess as a liquid reaction medium or component thereof. On the other hand, if desired, such alcohol may be employed in an amount less than that equimolecular with the (thiocyanato) phenol compound, and therefore in a limiting amount. In carrying out the method, the alcohol and (thiocyanato) phenol compound, dissolved together in further portions of alcohol or in an inert liquid reaction medium which may be water, tetrahydrofuran or a dialkyl ether, are added in a slow stream to a solvent solution of base. The solvent employed to dissolve the base should desirably be an alcohol of the same identity as that employed also as reactant and solvent in the other solution or should be an inert liquid reaction medium such as a dialkyl ether, tetrahydrofuran or the like. Desirably but not necessarily it should be of volatility distinctly different from that of the product. The base to be employed can be an alkali metal alkoxide, an alkali metal hydroxide, a tertiary amine or other strongly basic amine or the like. Desirably, an amount equivalent to 1 to 3 times the molecular proportion of (thiocyanato) phenol of the said base should be present in the solution thereof.

Upon the completion of the combining of the reactants, the resulting reaction mixture is heated at a reaction temperature, typically between room temperature and 200° C., preferably between about 50° and 150° C. for a period of time such as from about 5 minutes to about 100 hours, and typically from about 20 minutes to about 6 hours to carry the reaction to a desired degree of completion. Product is formed in at least small amounts immediately upon the contacting together of all the components of the reaction mixture. However, especially at lower temperatures, yields obtained tend to be quite low after only short reaction periods. When yield more clearly quantitative is desired, heating should be employed or an extended reaction time, preferably with stirring, should be provided.

When the reaction has gone forward to the desired degree, typically to the exhaustion of a limiting reactant, excess liquid reaction medium can be removed by, for example, vaporization under atmospheric or subatmospheric pressure, and the resulting product residue permitted spontaneously to cool to room temperature. The resulting residue may then be poured into a mixture of ice and concentrated hydrochloric acid whereby to neutralize any excess of basic material and to permit, typically, separation of product as a solid of very low solubility in water. From this point forward, routine purification procedures applicable in all the syntheses of the present compounds can be employed.

In a third process for the preparation of any of the products of the present invention, a hydroxy alkylthiophenyl thiocyanate of the formula

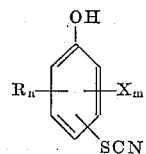
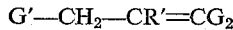

is caused to react with a halocarbon compound of the formula $$G'-CH_2-CR'=CG_2$$

wherein G' represents halogen and all other symbols have the values hereinbefore defined. The reaction goes forward in the presence of a base, and desirably in an inert liquid reaction medium. Tetrahydrofuran, a dialkyl ether, an alcohol, water or other inert liquid reaction medium may be employed. The reaction goes forward smoothly, obtains good yields, and employs starting materials efficiently. It goes forward at a good rate at room temperature, usually reaching completion in from about 2 to about 4 hours, depending upon quantities of reactants employed, temperature, whether stirring is employed and other factors. At lower temperature, times of up to 200 hours may be desired to obtain maximum yield, whereas at reflux temperature of colvent, typically a temperature between 50° and 150° C., much shorter times, such as 20 minutes to an hour or 2 hours give good results. Some of the desired product is formed immediately upon the contacting together of the reactants and when small yield of products in the presence of relatively large amounts of unconsumed starting material is satisfactory, very short reaction times can be employed and the resulting reaction mixture employed in crude form shortly after the initiation of the reaction to obtain at least minimum benefits according to the present invention. When it is desired to obtain product in maximum yield, the reaction is permitted to go forward to a desired degree of completion or to its natural termination point which is usually the exhaustion of a limiting reactant, and a crude reaction mixture thereof subsequently employed. When it is desired to obtain products in highly purified form, the reaction mixture is warmed under atmospheric or subatmospheric pressure, to vaporize and remove liquid reaction medium and the resulting product-containing residue is purified in routine manners which apply alike to all the methods of synthesis by which the present products are advantageously prepared.

Upon completion of the reaction in any of the syntheses, the compound product of the present invention can be purified in any of various manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms in which the desired product is a solvent-soluble fraction. Representative solvents include diethyl ether, chlorinated hydrocarbons, and benzene. The said precipitate is extracted with solvent, the solvent extract dried over an inert drying agent such as, for example, anhydrous sodium sulfate or the like; the solvent vaporized and removed and the remaining product chilled or otherwise induced to crystallize and, if desired, recrystallized from a solvent such as benzene, lower aliphatic hydrocarbons, methylcyclohexane, or a lower alkanol. In another manner, the reaction mixture is fractionally distilled to vaporize and remove solvent and, in a relatively narrow boiling range, product.

When production of the present compound is to be carried out on an industrial scale, various other methods of separation and purification may be preferred, including, for example, centrifugation, decantation, vacuum distillation, and the like.

The following examples, without more, will enable those skilled in the art to practice the present invention:

Example I.—p-(Allylthio) phenol

A reaction mixture is prepared, consisting of 12.6 grams (0.1 mole) of p-mercaptophenol, 4.6 grams of sodium hydroxide and 7.65 grams (approximately 0.1 mole) of 1-chloropropene-2 (allyl chloride) dispersed in methanol. The resulting reaction mixture is placed in a flask under reflux. The reaction mixture is thus heated at its reflux temperature (a pot temperature between approximately 60° and 80° C.) for about 2 hours to carry the reaction to completion. At the end of this reaction period, the resulting hot mixture is filtered to remove sodium chloride of reaction, and the filtrate heated to vaporize and remove methanol solvent. The resulting substance is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous sodium sulfate; the resulting liquid is warmed to vaporize and remove ether solvent and obtain a residual oil. This oil crystallizes upon standing; the crystals are taken up in hot ethanol and precipitated therefrom as the ethanol cools, to obtain a p-(allylthio) phenol product as white crystals melting at 42°–43° C. and having a molecular weight of 166.2. The compound is an effective conditioning agent for soil. Incorporated thinly into the surface of a body of natural soil in a concentration of 0.2 weight percent, the compound prevents formation of a dense crust upon the evaporation from the soil of water resulting from rainfall. The compound is also useful as an anthelmintic, especially for the control of nematodes that parasitize warm-blooded animals. Also, the compound is of use as a herbicide and insecticide.

Example II.—o-(Allylthio) phenol

In procedures essentially similar to the foregoing except that the starting mercaptan is o-mercaptophenol, there is prepared o-allylthiophenol as a colorless oil, boiling at 110° C. under a pressure of about .019 atmosphere. The compound has a refractive index for the D line of sodium light of 1.5778 at 25° C. The compound is an effective insecticide and anthelmintic.

Also, by the reaction of 1-chloro-octene-2 and p-mercaptophenol there is obtained a p-(2-octenylthio) phenol.

Also, from 1,3-dichloro-2-butene and o-mercaptophenol, an o-(3-chloro-2-butenylthio) phenol product as a colorless oil boiling at 98°–110° C. under 0.7–0.8 millimeter mercury pressure. The compound is an insecticide, herbicide, and molluscacide. In a concentration of 1 part per million in water it gives complete kill of a population of ramshorn snails upon 24 hours' exposure.

In procedures similar to the foregoing, from 3-bromopropene and 4-mercapto-3,5-xylenol, in the presence of sodium hydroxide, there is prepared a 4-allylthio-3,5-xylenol as a colorless oil boiling at 116° C. under 0.4 millimeter mercury pressure and having a refractive index of 1.5844 for the D line of sodium light at 25° C. The compound has a molecular weight of 194.3. An aqueous dispersion containing the present compound in the concentration of 0.4 percent by weight of resulting composition gives 100 percent kill of a group of healthy tomato plants when applied as a wetting spray to the foliage of the said plants. It kills crabgrass, wild oats, various legumes, and plants of other kinds also.

Also, by reaction of (4-hydroxy-2-methyl-5-nitrophenol) thiocyanate and 2-butene-1-ol a 4(2butenylthio)-6-nitro-m-cresol product.

And from 4-hydroxy-3-methoxyphenyl thiocyanate and allyl chloride, a 4-(allylthio)-2-methoxyphenol boiling at 109°–110° C. under pressure of 0.3 millimeter mercury absolute.

Similarly, by reacting (3,5-difluoro-4-hydroxyphenyl) thiocyanate and 3-iodopropene, a 4-(allylthio)-1,6-difluorophenol product.

In another representative preparation, by causing a reaction between (3,5-dibromo-4-hydroxyphenyl) thiocyanate and 3,3-dichloro-2-propen-1-ol, there is obtained a 2,6-dibromo-4-(3,3-dichloroallylthio) phenol.

Also, by reaction of (2,5-dibutyl-4-hydroxyphenyl) thiocyanate and 4-bromo-2-chloro-2-butene there is obtained a 2,5-dibutyl-4-(3-chloro-2-butenylthio) phenol product.

Similarly, by reacting (4-hydroxy-2,3,5,6-tetramethylphenyl) thiocyanate and 3-chloro-1,1-difluoropropene there is prepared a 4-(3,3-difluoroalkylthio)-2,3,5,6-tetramethylphenol.

The mercaptophenols that can be used as starting materials in the practice of the present invention are, for the most part, articles of commerce. However, those which are not can readily be prepared in known procedures such as, for example, those set forth in Monatshefte für Chemie IV, 165 (Vienna, 1883), by Haitinger, note particularly page 170. Haitinger's work led principally to the p-compound: The o and m compounds are similarly prepared with little or no difficulty.

The (hydroxyphenyl) thiocyanate starting materials are prepared in known methods of which the easiest is direct thiocyanation with thiocyanogen.

Most of the allyl and other alkenyl halides and alcohols are articles of commerce. Those that are not are readily prepared in known methods. See, for example, Synthetic Organic Chemistry (Wiley, New York, 1953), by Wagner and Zook, Chapter 4, Table 9, pages 125–127, and the references there designated.

I claim:
1. A compound corresponding to the formula

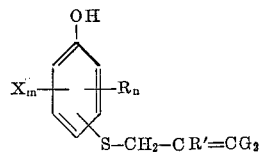

wherein R represents lower alkyl and $n$ is an integer from 0 to 2, inclusive, R' represents hydrogen or a lower alkyl group, X represents lower alkyloxy, halo, or nitro, $m$ is an integer from 0 to 3, both inclusive, and each G is independently selected from hydrogen, fluorine, chlorine or bromine, and R.
2. p-(allylthio) phenol.
3. o-(allylthio) phenol.
4. o-(3-chloro-2-butenylthio) phenol.
5. 4-allylthio-3,5-xylenol.
6. 4-(allylthio)-2-methoxyphenol.

No references cited.

CHARLES B. PARKER, *Primary Examiner.*